Feb. 14, 1961 U. S. MITCHELL 2,971,715

TAPE CARTRIDGE WITH BELT DRIVE

Filed May 5, 1960

INVENTOR.
ULYSS S. MITCHELL

BY

Lippincott, Ralls & Hendricson
ATTORNEYS 2,971,715

TAPE CARTRIDGE WITH BELT DRIVE

Ulyss S. Mitchell, 1150 Yew St., San Mateo, Calif.

Filed May 5, 1960, Ser. No. 27,211
6 Claims. (Cl. 242—55.13)

Figure 1:
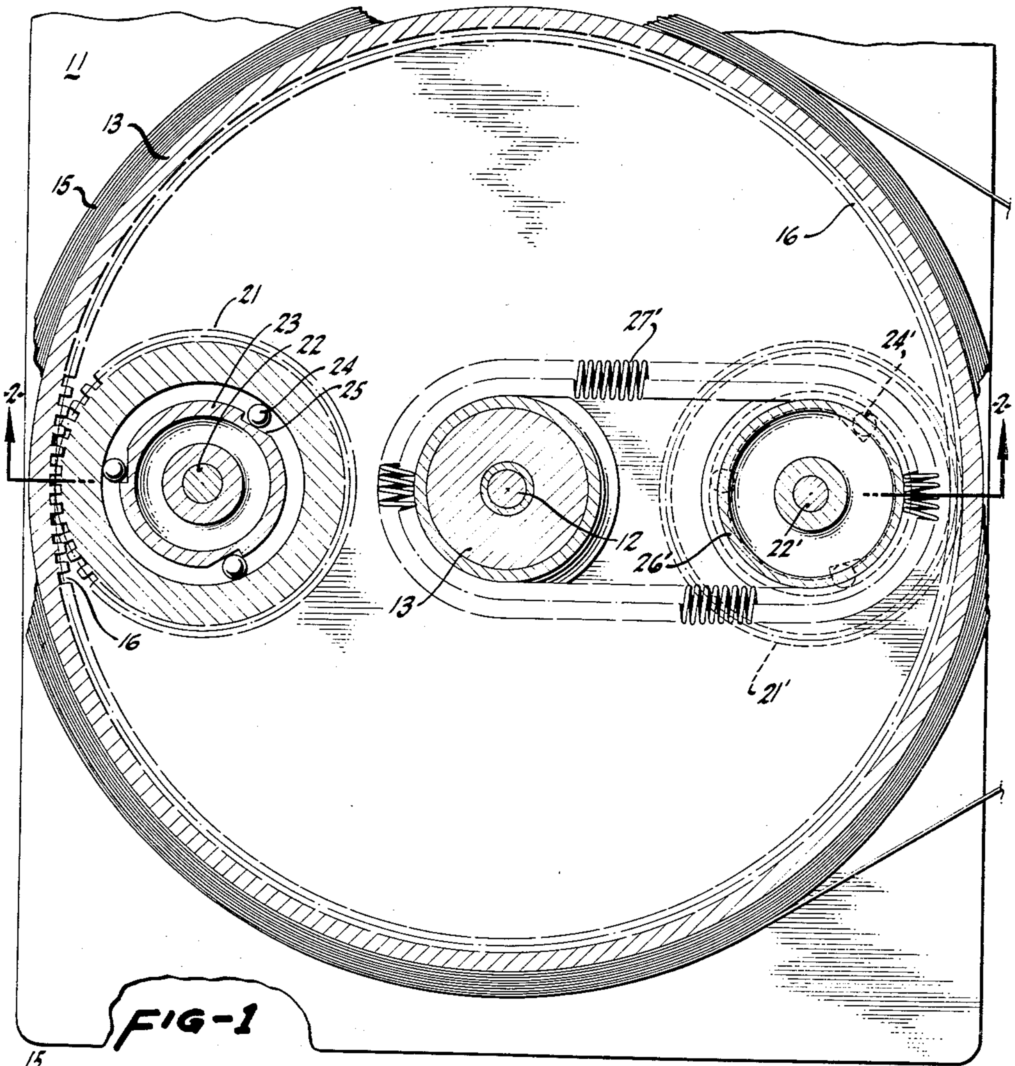

The present invention relates to an improvement in cartridges for magnetic tape which are adapted to contain magnetic tape for both supply and take-up thereof during recording or playback operations. More particularly, the present invention relates to a tape cartridge having two drums for the supply and take-up of magnetic tape, and including an improved and integral reversing drive connection between the cartridge drums so that the take-up drum is at all times driven in proper relationship to the supply drum for maintaining a steady tension on tape passing through such as a playback head.

The magnetic tape cartridge of the present invention is an entirely self-contained unit, wherefrom magnetic tape may be unreeled and also rewound during operations such as tape playback, and having integral drive means of a differential nature between the separate drums of the cartridge for maintaining the necessary changing ratio of rotational velocity therebetween during such operations. It will be appreciated that in the playback of magnetic tape, such tape may initially be substantially entirely wound upon a single drum of a cartridge and extend through playback means into connection with the other drum. During the playback of the tape same is withdrawn from the supply portion of the cartridge and rewound upon the take-up portion. As this progresses, the effective diameter from which the magnetic tape is withdrawn will be seen to decrease as the amount of magnetic tape upon the supply portion of the cartridge decreases, and likewise, the effective diameter upon which the magnetic tape is rewound will increase as additional amounts of tape are wound upon the take-up portion of the cartridge. Conventional magnetic tape recording and playback apparatus provides for the forcible withdrawal of magnetic tape from a reel or cartridge, as for example, by means of drive means and pinch wheels, or the like. However, this drive means serves only to withdraw tape from the supply portion of the cartridge, and in order to maintain the desired take-up operation, the present invention provides for driving the take-up drum of the cartridge from the supply drum thereof. Because of the constantly varying required angular velocities of the two drums, it is not possible to provide a simple, direct drive between the drums of the cartridge, but instead, it is necessary to provide for a differential drive. This problem is compounded by the fact that the miniaturization of magnetic tape cartridges is highly desirable, and consequently, the change in effective diameter of the supply and take-up drums varies greatly throughout the playing of an entire tape. Because of this it is necessary for the differential drive mechanism to accommodate a very large change in drive ratio. In this respect, it is noted that a magnetic tape cartridge of conventional size may require an initial drive ratio of about four to one between the take-up and supply portions thereof, and a final drive ratio of about one to four between these same portions.

While it is well recognized that numerous differential drive mechanisms have been developed, many of these are found to be quite unsatisfactory for the particular application herein envisioned, inasmuch as undue complexity and consequent cost attaches thereto. Magnetic tape cartridges are normally considered to be necessarily inexpensive to the point of comprising but a minor percentage of the cost of the tape wound thereon. Balanced against this requirement of simplicity and low cost, is the requirement of high-quality performance necessary for high fidelity reproduction from magnetic tapes.

Various approaches to the problems of handling magnetic tape have been advanced, and, of course, the more common approach is the provision of two, separate reels, wherein magnetic tape is wound from one to the other. This approach has been found to suffer from numerous disadvantages, among which are the substantial problems of space requirements and loss of unity of the tape container. Early approaches to the above-noted difficulties provided the advancement wherein magnetic tape is wound upon a single reel in an endless loop for removal from the center thereof, and subsequent rewinding upon the outer circumference of same. While this type of device overcomes a certain amount of the prior-art difficulties, it introduces new difficulties in that the magnetic tape is therein required to slide with respect to adjacent turns of same during simultaneous unwinding and rewinding operations upon a single reel. This has proven to be quite disadvantageous, in that high fidelity reproduction from the tape is seriously affected, possibly by the static charges introduced into the tape from the relative slippage thereof.

The present invention provides a single-reel magnetic-tape cartridge wherein the reel includes a pair of drums between which the magnetic tape is wound. The invention hereof particularly relates to the relationship between the separate drums of the single reel, and to the differential drive means included in the tape cartridge hereof for accommodating the required differential drive ratio between such drums. Although various differential drive mechanisms may be possibly employed in this respect, the present invention provides for a highly advantageous tape movement between the cartridge drums through the utilization of combined direct drive connections and spring belt connections, Furthermore, the present invention provides for the automatic drive of either drum from the other drum, depending upon which one is being employed as the supply drum. The differential drive mechanism integral with the single-reel cartridge hereof has proven to provide a material increase in longevity, inasmuch as the working parts are not subject to substantial wear, and yet this is herein achieved by a relatively uncomplicated and inexpensive construction. At all times the single-reel tape cartridge hereof provides for the maintenance of a steady desired tension upon magnetic tape being fed through playback or recording mechanism associated with the cartridge, and thus achieves the desired tape traverse necessary for high fidelity operation.

It is an object of the present invention to provide in a single-reel magnetic-tape cartridge, an improved varying-ratio drive connection between a pair of drums thereof so as to accommodate the traverse of tape from one drum to the other.

It is another object of the present invention to provide improved, integral differential drive mechanism for a double-drum, single-reel, magnetic-tape cartridge, wherein alternate drive trains each include both geared connection and spring belt connection for insuring positive differential drive throughout long use of the cartridge.

It is a further object of the present invention to provide differential drive mechanism of simplified construction and inexpensive manufacturing cost for transmitting rotary motion between the drums of a single-reel, magnetic-tape cartridge.

Various other objects and possible advantages of the present invention will become apparent to those skilled in the art from the following description of a single, preferred embodiment of this invention; however, no limitation is intended by the terms of such description, and instead, reference is made to the appended claims for a precise delineation of the true scope of this invention.

Figure 2:
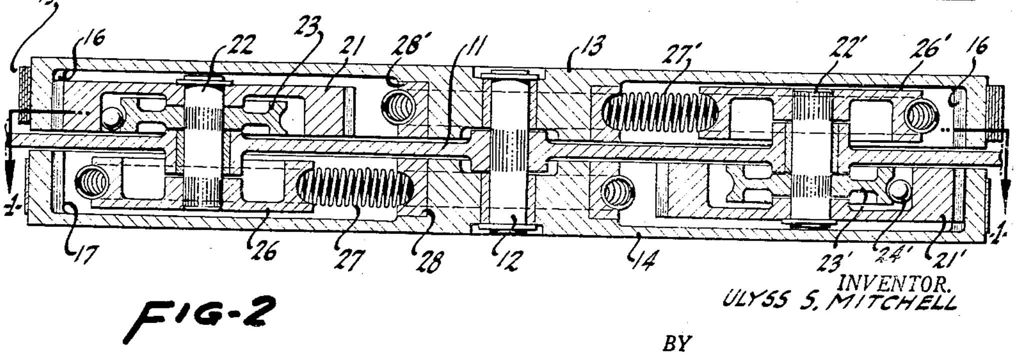

The invention is illustrated as to a single embodiment thereof in the accompanying drawings, wherein:

Fig. 1 is a plan view in section through the single-reel magnetic-tape cartridge of the present invention; and Fig. 2 is a transverse sectional view of such cartridge taken in the plane 2—2 of Fig. 1.

Considering now the illustrated embodiment of the present invention, and referring to the drawings, there will be seen to be provided a central plate 11 having an axle 12 extending transversely therethrough at the center thereof and mounting a pair of drums 13 and 14 upon opposite sides of the plate for rotation upon the axle. The central plate 11 may extend beyond the circumference of the drums 13 and 14 to provide means for mounting the cartridge in a tape recorder, for example. The axle 12 is preferably fixed in the central plate, as in extension through a boss thereon, and by the utilization of splines or other similar connection thereto. The drums 13 and 14 are formed of shallow, hollow configuration, with peripheral walls adapted to have magnetic tape 15 wound thereabout, and the drums are mounted in facing relation to each other upon the axle 12 as by means of central drum bosses apertured to receive the axle. Suitable bearing surfaces may be provided as desired, and suitable locking means may also be provided for insuring retention of the drums upon the axle. Interiorly of each of the drums and about the inner surface of the peripheral walls thereof, there are provided toothed surfaces 16 and 17.

Before proceeding with a description of the remainder of the differential drive mechanism of the present invention, it is first noted that in operation of a magnetic-tape cartridge of this type the magnetic tape is forcibly withdrawn from one of the drums thereof by suitable means exteriorly of the cartridge. Commonly, this withdrawal means may include a rotating disc or shaft, and one or more pinch wheels operable to press the magnetic tape against the shaft, so that the magnetic tape is then drawn from the drum across a playback or recording head, and is then available for rewinding upon the other drum. The present invention provides for the driven rotation of the other or take-up drum from the supply drum, to automatically rotate the take-up drum at the proper speed to accommodate rewinding of the tape. Further to the operation hereof, either of the drums may comprise the supply drum of the cartridge, and consequently, the differential drive mechanism hereof is operable to drive either of the drums from the other drum. A sole motivating force herein employed to rotate the drums is that provided exteriorly of the cartridge by the magnetic-tape apparatus, wherein the tape itself is drawn across the playback or recording head. All driving force for the take-up drum of the cartridge is thus provided from the supply drum as same is rotated by the tape being withdrawn therefrom. Inasmuch as the drums of the cartridge hereof may alternate with regard to take-up and supply functions, there is provided in the differential drive mechanism a duplication of drive means, and thus in the following description of same, but a single drive means is initially described with subsequent notations as to important structural portions and operating differences between forward and reverse drive, as provided by the other half of the drive means.

Within the shallow depression of the upper drum 13, there is provided a gear 21 which is disposed to engage the toothed periphery thereof with the toothed surface 16 of the upper drum. Mounting of this upper gear 21 is accomplished by means of a first drive shaft 22 mounted for rotation in the central plate 11, and extending into both of the drums. About this first drive shaft 22 within the upper drum 13, there is provided a clutch shell 23 which is affixed to the drive shaft as by splines or the like, and which is disposed in an annular depression in the under surface of the gear 21. Mounting of the gear 21 upon the drive shaft 22 is accomplished by extending the drive shaft through the gear and providing such as a snap ring above such connection, whereby the gear is free to rotate about the shaft. Driving engagement between the gear and shaft is attained by reversing clutch means, illustrated in Fig. 1 as including a plurality of small metal balls, or spheres, such as ball bearings 24, disposed about the periphery of the clutch shell and retained therein by notches 25 formed in such periphery. A reversing drive connection is afforded by the particular configuration of the openings or notches in the periphery of the clutch shell, wherein such notches extend radially inward of the shell a short distance, and then generally tangentially outward so that the balls 24 fit relatively loosely between the clutch shell notch and the inner surface of the gear 21. With this arrangement, rotation of the gear in a clockwise direction, as illustrated in Fig. 1, will cause the balls or spheres 24 to likewise rotate in a clockwise direction, so as to move outwardly of the notch in the clutch shell, and consequently, to relatively bind between the gear and clutch shell and lock these elements together. An alternative rotation of the gear 21 in a counterclockwise direction will be seen to likewise rotate the small spheres 24 counterclockwise, so that they move inward of the notch, and consequently, readily roll upon the inner surface of the gear. In this direction of rotation of the gear, there will thus be seen to be provided no driving connection between same and the clutch shell, inasmuch as the notch depth is just sufficient that the small spheres will fail to make driving contact with the gear when the spheres have moved to the deepest part of the notch. It will thus be seen that rotation of the upper drum 13 in one direction only, will cause the gear 21 therein to be rotated so as to lock same with the clutch shell 23, and consequently, to rotate this clutch shell and the attached drive shaft 22.

As above noted, the drive shaft 22 extends through the central plate 11 into the lower drum 12, and within this lower drum the drive shaft 22 is affixed, as by splines, to a pulley wheel 26 so as to rotate the latter with rotation of the drive shaft. Driving connection of the upper and lower drums is completed by a spring belt 27 disposed about the lower pulley wheel 26 and also about a central portion of the lower drum 14, such as, for example, a pulley wheel insert 28, illustrated in Fig. 2 as being affixed to the central boss of this drum. The spring belt 27 is formed as a helical spring in a loop of sufficient length to extend about the pulley wheel 26 and pulley wheel insert 28 in tension.

The above-described differential drive mechanism will be seen to transmit rotational drive to the lower drum 14 from the upper drum 13, when the upper drum is rotated in a clockwise direction by external mechanism withdrawing tape therefrom. The clutch balls or spheres 24 of the upper drum, in this circumstance are seen to rotate to the outer portions of the notches in the clutch shell, so as to bind together the clutch shell and gear, and consequently, to transmit motion through the drive shaft 22 and the spring belt 27 to the lower drum 14. An initial drive ratio is attained by the difference in number of gear teeth and diameter of the upper drum and upper gear 21. In a conventional example, the initial drive ratio may be of the order of four to one, so that the lower drum is thence rotated at a rotational velocity of approximately four times that of the upper drum. This is required in the instance wherein a large amount of tape is wound upon the upper drum and is being removed therefrom and wound upon the lower drum. Clearly, the drive ratio between the drums must vary as the mount of tape upon the upper drum decreases, and that upon the lower drum increases, inasmuch as the relative diameters from which the tape is being removed and at which same is rewound vary. This is herein accomplished by slippage in the pulley arrangement within the lower drum. The spring pulley belt 27 about the pulley wheel 26, and pulley insert 28 on the lower drum, provides a rather precisely determinable frictional engagement so as to exert a known maximum amount of force upon the lower drum, and as the rotational speed of the lower drum is to be decreased, this pulley arrangement will provide a constant force upon the tape being wound upon the lower drum. This is particularly important in high fidelity reproduction, inasmuch as same insures a constant tape tension. At the opposite extremity of operation, wherein substantially all tape is unwound from the upper drum, and is at that time wound upon the lower drum, it will be appreciated that the driven lower drum must rotate at a much lesser rotational velocity than the upper drum, and same is accomplished herein by slippage in this frictional engagement of the spring pulley belt 27.

With respect to reverse operation of the double-drum reel hereof, it will be seen from the drawing that a substantially identical but reversed drive mechanism is provided for rotating the upper drum in response to rotational motion of the lower drum. Thus, in the instance wherein tape is being withdrawn from the lower drum so that same is forcibly rotated, a driving force will be transmitted to the upper drum, and in the interests of clarity, the differential drive mechanism for this purpose, shown at the right of Fig. 2, is identified as to the individual portions thereof by the same numerals as employed above in connection with the first-mentioned drive mechanism, but with the addition of primes upon the numerals. Thus the second drive shaft is seen to be identified by the numeral 22', for example..

With regard to the reversing clutches of the present invention, it will be seen that a wholly automatic operation is provided by the structure which affords positive engagement between gear and clutch shell for but one direction of rotation of the gear. The notches 25' in shell 23' are directed oppositely to the notches 25 in shell 23, so that drum 13 will drive drum 14 in one direction, and drum 14 will drive drum 13 in the opposite direction only. It is also noted that the notches provided in the clutch shell to accommodate the small balls or spheres are formed of a greater diameter than the spheres themselves, so that the spheres normally rest at the bottom of the notches. With the application of a driving force through the gear 21 to the ball, so as to rotate same toward the narrow portion of the clutch notch, it will be seen that the balls then lock themselves between the gear and clutch shell, so that rotational motion is imparted from the former to the latter. Any reversal of rotation of the gear immediately unlocks this connection, inasmuch as the clutch balls are rotated out of the narrow portion of the notch into the deeper portion thereof, whereby same are free to rotate without binding between the inner surface of the gear and the clutch shell. Fully automatic operation is thus achieved.

There has been described above an improved double-drum cartridge for magnetic tape adapted to contain magnetic tape for playback or recording, and furthermore, providing for the supply and take-up of such tape during these operations. Included in the cartridge are differential drive mechanisms automatically operable in reverse directions so that tape may be removed from either drum and fed upon the other, and wherein the take-up drum of the reel is at all times driven in such relation to the supply drum that a substantially constant tension is maintained upon the magnetic tape. Of further and particular importance herein is the actual, physical structure of the differential drive means, wherein the positive action of geared connections is attained, and furthermore, the highly desirable controlled frictional engagement of parts is incorporated to accomplish the differential drive ratio without the disadvantage of variations with wear. It is herein contemplated that the elements of the drive mechanism shall be formed of relatively long wearing materials, such as spring steel for the belts, wherein slippage necessarily occurring will not cause a wearing of the parts to consequently limit the longevity thereof. The particular drive mechanism of the present invention provides substantially constant tape tension during operation of the cartridge over extended periods of time, and substantially without regard to the possibility of parts failure and wear, which would tend to introduce variations in the desired drive ratios.

What is claimed is:

1. An improved magnetic tape cartridge comprising a central plate, a pair of hollow drums disposed in facing relation on opposite sides of said plate and mounted for rotation about a common axle, a pair of drive members geared to separate drums through reversing clutches of opposite sense, means mounting said drive members for rotation in said plate in extension therethrough, and a pair of loop springs separately engaging the two drums and the drive means therein extending from the geared attachment of same whereby forced rotation of one drum as by withdrawal of tape wound thereabout drives the other drum to rotate at the ratio of the gearing as modified by slippage of the spring engagement.

2. An improved reel for magnetic tape comprising a pair of tape drums disposed in facing relation and mounted for rotation about a common axle, each of said drums having a pulley wheel affixed coaxially thereto, a pair of drive shafts separately geared to the two drums through reversing clutches of opposite sense whereby rotation of either drum in one direction rotates the corresponding drive shaft, and a pair of springs separately disposed about the two pulley wheels and separtely engaging the two drums about central portions thereof for driving of each drum from the other.

3. An improved magnetic tape reel for the simultaneous supply and take-up of magnetic tape comprising a pair of shallow hollow drums mounted in facing relation for coaxial rotation and adapted to have a single magnetic tape wound about the peripheries of each, a pair of pulley wheels with one coaxially affixed to each drum interiorly thereof for driving the drum to which same is affixed, a pair of drive shafts with one geared to each of said drums interiorly thereof and extending into the other drum for driven rotation from the attached drum, a reversing clutch in each of said geared connections with such clutches being disposed in an opposite sense whereby each drive shaft is driven in only one direction from the drum to which it is geared and the directions of driven rotation of said shafts being opposite, and a pair of spring belts with one disposed about each of said pulley wheels and extending about the drive shaft extending from the opposite drum, whereby forced rotation of one drum drives the other drum to rotate at an angular velocity dependent upon the ratio of gearing between drive shaft and drum as modified by slippage of the pulley belt.

4. An improved magnetic tape reel as set forth in claim 3. further defined by said elastic pulley belts each comprising a coil spring in an endless loop.

5. An improved magnetic tape cartridge for simultaneously supplying and receiving a single magnetic tape wound thereon and comprising a central plate having an axle extending centrally therethrough, a pair of drums mounted for rotation upon said axle on opposite sides of said plate and each having a circumferential edge wall adapted to receive magnetic tape wound thereabout, a pair of drive shafts mounted for rotation in said plate and each extending into both drums, a pair of gears mounted for rotation about said shafts with one gear in each drum and engaging a toothed inner surface thereof for driven rotation by the drums, means locking one drive shaft to the adjacent gear for one direction of rotation of the latter while freeing the shaft for opposite rotation and locking the other drive shaft to the adjacent gear for the opposite direction of rotation of the latter and freeing the shaft for the other direction of rotation, a separate pulley about the end of each drive shaft within the drum that the shaft is not otherwise engaging, and a spring belt about each of said pulleys in extension about an internal boss on the adjacent drum for transmitting rotational drive between drums in a ratio determined by the ratio of gearing as modified by slippage of said spring belts.

6. An improved magnetic tape cartridge for simultaneously supplying and receiving a single magnetic tape wound about each of a pair of drums as such tape is forcibly withdrawn from one drum and adapted to drive the other drum for receiving the tape, comprising a fixed central mounting plate having a central axle therethrough upon which a pair of opposed drums are mounted for free rotation by internal drum bosses about the axle, each of said drums having a peripheral wall adapted to have tape wound about the exterior thereof and further having a toothed interior, a pair of drive shafts mounted for rotation in said plate and each extending into both drums on opposite sides of said axle, a pair of shells fixed one to each of said shafts in opposite drums and defining driven shaft ends, a gear about each of said shells engaging the adjacent toothed drum wall for rotation therefrom, means including balls riding in tapered slots in the periphery of said shells locking the shell to the surrounding gear for one direction of rotation only and said means having the shell slots tapered in a different direction in one shell from the other for locking different shells for different directions of drum rotation, a pulley wheel affixed to each of said shafts in the opposite drum from the driven shaft end, and a pair of spring belts separately disposed in extension about each shaft pulley and the adjacent drum boss for driving the latter to rotate the drum from driven rotation of the other drum whereby either drum is driven through a drive shaft by the forcible rotation of the other drum and said drive ratio is determined by the gear ratio at the gear-drum engagement modified by the slippage of the driving spring belt so as to maintain a constant tension on magnetic tape withdrawn from one drum and fed back onto the other.

No references cited.